United States Patent
Le Faucheur et al.

(10) Patent No.: US 8,565,248 B2
(45) Date of Patent: Oct. 22, 2013

(54) PURE CONTROL-PLANE APPROACH FOR ON-PATH CONNECTION ADMISSION CONTROL OPERATIONS IN MULTIPROTOCOL LABEL SWITCHING VIRTUAL PRIVATE NETWORKS

(75) Inventors: Francois Laurent Le Faucheur, Valbonne (FR); Ashwini Dahiya, Anandnagar (IN); Ashok Narayanan, Lexington, MA (US)

(73) Assignee: Cisco Technology, Inc., San Jose, CA (US)

(*) Notice: Subject to any disclaimer, the term of this patent is extended or adjusted under 35 U.S.C. 154(b) by 153 days.

(21) Appl. No.: 12/147,265

(22) Filed: Jun. 26, 2008

(65) Prior Publication Data

US 2009/0323698 A1  Dec. 31, 2009

(51) Int. Cl.
*H04L 12/28* (2006.01)
(52) U.S. Cl.
USPC ............ 370/409; 370/400; 370/353; 370/229
(58) Field of Classification Search
USPC ......... 370/229, 238, 254, 256, 289, 328, 331, 370/338, 349, 353, 400, 409; 709/230–235, 709/246, 247; 714/2, 4, 43
See application file for complete search history.

(56) References Cited

U.S. PATENT DOCUMENTS

| | | | |
|---|---|---|---|
| 7,715,309 B2* | 5/2010 | Scholl et al. | 370/218 |
| 7,859,993 B1* | 12/2010 | Choudhury et al. | 370/217 |
| 2007/0110025 A1* | 5/2007 | Guichard et al. | 370/351 |
| 2007/0183317 A1* | 8/2007 | Vasseur et al. | 370/225 |
| 2008/0008168 A1* | 1/2008 | Nadeau et al. | 370/389 |
| 2008/0080509 A1* | 4/2008 | Khanna et al. | 370/392 |
| 2008/0092229 A1* | 4/2008 | Khanna et al. | 726/15 |

OTHER PUBLICATIONS

Manner et al.; "NSLP for Quality of Service Signaling"; Feb. 7, 2008; IETF; Internet Draft, pp. 5-12.*
Awduche et al.; "RSVP-TE: Extensions to RSVP for LSP Tunnels"; Dec. 2001; IETF; Request for Comments: 3209; pp. 1-62.*
Brunner et al.; "Requirements for Signaling Protocols"; Apr. 2004; IETF; Request for Comments: 3726; pp. 1-32.*
Bader et al.; "RMD-QOSM-The Resource Management in DiffServ QOs Model"; Jun. 23, 2006; IETF; Internet Draft; pp. 1-82.*
Farrel et al.; Encoding Attributes for Multiprotocol Label Switching (MPLS) Label Switched Path (LSP) Establishment Using Resource Reservation Protocol—Traffic Engineering (RSVP-TE); Feb. 2006; IETF; Request for Comments 4420; pp. 1-21.*

(Continued)

*Primary Examiner* — Marcus R Smith
*Assistant Examiner* — Mark A Mais
(74) *Attorney, Agent, or Firm* — Schwegman, Lundberg & Woessner, P.A.

(57) ABSTRACT

The embodiments described herein present methods and apparatuses for on-path CAC operations in a MPLS-VPN environment. In an example embodiment, an ingress PE device receives a quality of service (QoS) resource reservation request; constructs an outgoing message that includes information allowing an egress PE device to identify the virtual private network routing and forwarding table (VRF) associated with a resource reservation resulting from the QoS resource reservation request; and transmits the outgoing message to the egress PE device, where the information allowing VRF identification is echoed back by the egress PE device and used by the ingress PE device to identify the VRF associated with the resource reservation resulting from the QoS resource reservation request. Other embodiments are described.

39 Claims, 9 Drawing Sheets

(56) References Cited

OTHER PUBLICATIONS

Rosen et al.; "BGP/MPLS IP Virtual Private Networks (VPNs)"; Feb. 2006; IETF; Request for Comments: 4364; pp. 1-47.*

Braden et al.; "Resource Reservation Protocol (RSVP)—Version 1 Functional Specification"; Sep. 1997; IETF; Request for Comments 2205; pp. 1-112.*

"Chapter 48—Resource Reservation Protocol", *In: Internetworking Technologies Handbook*, [online]. (c) 1992-2006 Cisco Systems, Inc. Retrieved from the Internet: <URL: http://www.cisco.com/univercd/cc/td/doc/cisintwk/ito_doc/rsvp.pdf>, 48-1-48-12.

"Converge! An Introduction to MPLS", [online]. [retrieved Aug. 27, 2007]. Retrieved from the Internet: <URL: http://www.convergedigest.com/Bandwidth/archive/010910TUTORIAL-rgallaher1.htm>, 2 pgs.

"Multi-Protocol Label Switching (MPLS)", [online]. [retrieved Aug. 27, 2006]. Retrieved from the Internet: <URL: http://www.protocols.com/papers/mpls.htm>, 2 pgs.

Braden, R., et al., "Resource ReSerVation Protocol (RSVP)", *Request for Comments*: 2205, (Sep. 1997), 112 pgs.

Davie, B., et al., "Support for RSVP in Layer 3 VPNs", The IETF Trust, 2007 [retrieved: Nov. 16, 2007], Retrieved from the Internet: <URL: http://tools.ietf.org/id/draft-ietf-nsis-ntlp-14.txt>, (Jul. 30, 2007), 16 pgs.

Le Faucheur, F., et al., "Aggregation of Resource ReSerVation Protocol (RSVP) Reservations over MPLS TE/DS-TE Tunnels", *Request for Comments*: 4804, (Feb. 2007), 29 pgs.

Manner, J., et al., "NSLP for Quality-of-Service Signaling", The IETF Trust, 2007 [retrieved: Nov. 16, 2007], Retrieved from the Internet: <URL: http://www.ietf.org/internet-drafts/draft-ietf-nsis-qos-nslp-15.txt>, (Jul. 25, 2007), 97 pgs.

Rosen, E., et al., "BGP/MPLS IP Virtual Private Networks (VPNs)", *Request for Comments*: 4364, (Feb. 2006), 47 pgs.

Rosen, E., et al., "Multiprotocol Label Switching Architecture",*Request for Comments*: 3031, (Jan. 2001), 57 pgs.

Schulzrinne, H., et al., "GIST: General Internet Signalling Transport", The IETF Trust, 2007 [retrieved: Nov. 16, 2007], Retrieved from the Internet: <URL: http://tools.ietf.org/id/draft-ietf-nsis-ntlp-14.txt>, (Jul. 9, 2007), 157 pgs.

* cited by examiner

US 8,565,248 B2

PURE CONTROL-PLANE APPROACH FOR ON-PATH CONNECTION ADMISSION CONTROL OPERATIONS IN MULTIPROTOCOL LABEL SWITCHING VIRTUAL PRIVATE NETWORKS

FIELD

The present disclosure relates generally to computer networks. In an example embodiment, the disclosure relates to a pure control-plane approach for on-path connection admission control (CAC) operations in multiprotocol label switching virtual private networks (MPLS VPN).

BACKGROUND

Resource ReSerVation Protocol (RSVP) and Next Steps in Signaling (NSIS) are network layer protocols designed to enable Internet applications to reserve resources across a network and obtain differing qualities of services (QoS). Such protocols are not routing protocols; however, both RSVP and NSIS work in conjunction with routing protocols, such as Open Short Path First (OSPF).

Multiprotocol Label Switching (MPLS) is a data-carrying mechanism that uses labels as a shorthand representation of an Internet Protocol (IP) packet's header. The use of the shorthand representation can increase the forwarding speed of routers. MPLS may also be used when implementing virtual private networks (VPN). MPLS is suited for such as task because of its ability to provide traffic isolation and differentiation with low overhead.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

Figure 1:
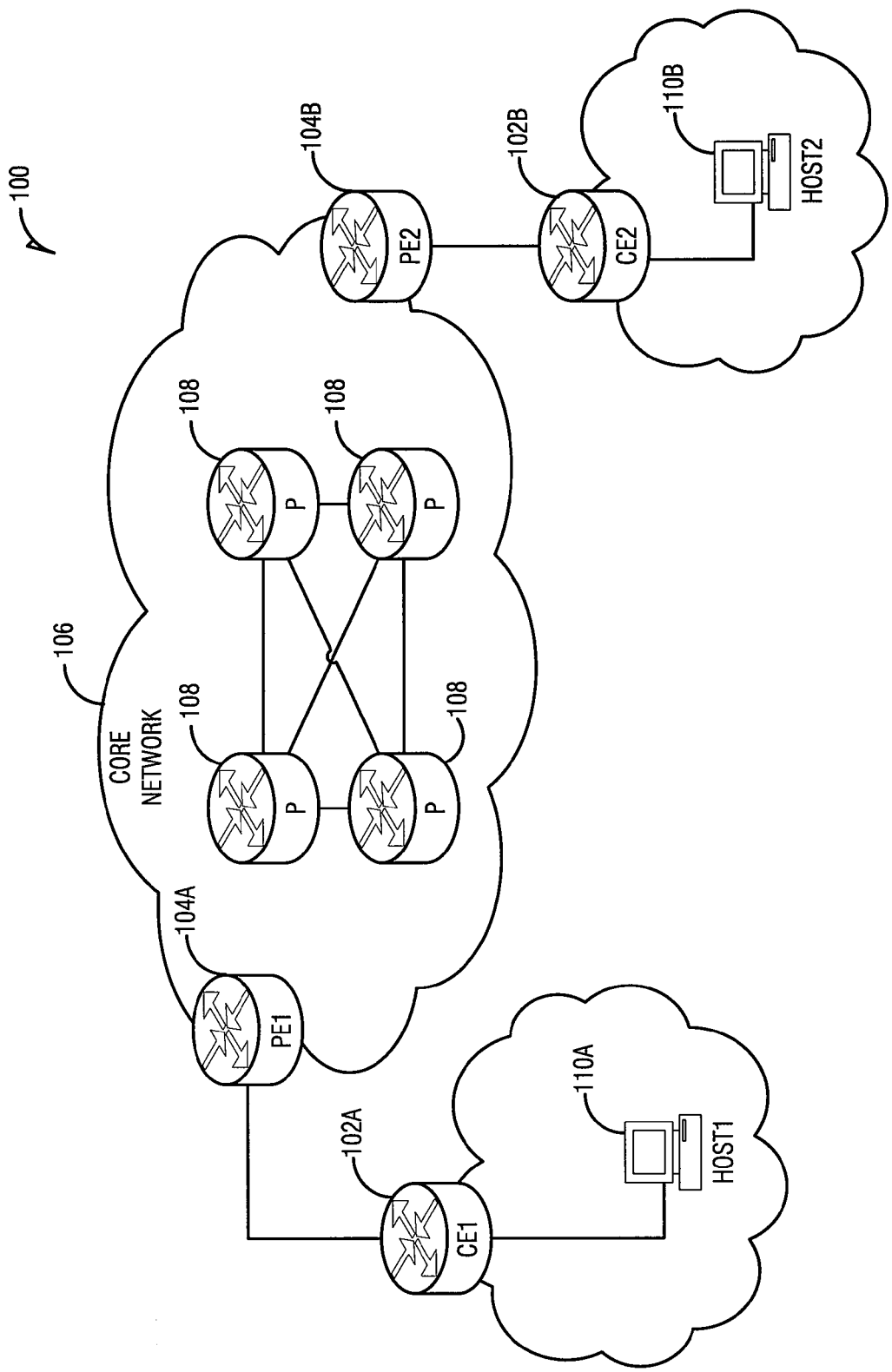
FIG. 1 is a diagram of a networked system, in accordance with an example embodiment.

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

In general, within a multiprotocol label switching virtual private network (MPLS-VPN), the virtual private network routing and forwarding table (VRF) is conveyed inside the MPLS header that encapsulates a packet. When an on-path signaling protocol includes the source and destination address information inside the protocol message itself and uses such information for routing, the on-path signaling protocol does not naturally have access to VRF information to easily provide VRF-aware routing because the packet is encapsulated within an MPLS header. This problem may exist with other protocols that include the source and destination addresses within the protocol message.

The embodiments described herein present methods and apparatuses for on-path connection admission control (CAC) operations in a MPLS-VPN environment. This disclosure describes the general concept of performing CAC operations in L3VPNs. One method of performing CAC in such an environment includes transmitting information that allows an egress provider edge (PE) to identify the virtual private network routing and forwarding table (VRF) associated with a resource reservation, where such information can be echoed back by the egress PE, thereby allowing an ingress PE to identify the VRF associated with the reservation. While examples are provided that illustrate such a process using RSVP and NSIS, it is understood that other network layer protocols may be used to obtain similar results. Various data structures and processes are described herein to achieve such messaging. While some data structures are provided as examples in the foregoing discussion, other data structures or processes to transmit the same or similar information are understood to be included in the scope of this disclosure.

In an example embodiment, a quality of service (QoS) resource reservation request is received at an ingress provider edge (PE) device from a customer edge (CE) device. An outgoing message that includes information allowing the ingress PE device to identify the virtual private network routing and forwarding table (VRF) associated with a resource reservation resulting from a QoS resource reservation request is constructed. The constructed outgoing message is transmitted to an egress PE device. The egress PE device may then echo back the VRF identification to be used by the ingress PE device to identify the VRF associated with the resource reservation that resulted from the QoS resource reservation request.

In an example embodiment, an incoming ReSerVation Protocol (RSVP) Path message is received. The Path message may be received by an ingress provider edge (PE). An outgoing RSVP Path message addressed to an egress provider edge (PE) device is then constructed, where the outgoing RSVP Path message includes: (i) a virtual private network routing and forwarding table (VRF) identification value and (ii) a VPN label. The VRF identification value may be echoed back by the egress PE in a RSVP Reservation (Resv) message, which may then allow the ingress PE to identify a corresponding relevant local VRF for Resv processing. In a similar manner, the VPN label may be used by the egress PE to identify a relevant local VRF for Path processing. The outgoing RSVP Path message to the egress PE device is then transmitted.

In another example embodiment, an incoming ReSerVation Protocol (RSVP) Path message is received. The Path message may be received at an egress PE. A VRF identification value and a virtual private network (VPN) label are extracted from the incoming RSVP Path message. The VRF identification value may be stored in the path state and the VPN label may be used to construct and forward an outgoing Path message to a customer edge (CE) device based on the VPN label.

In an example embodiment, the QoS resource reservation request includes an NSIS RESERVE message. In another example embodiment, the QoS resource reservation request includes an NSIS QUERY message.

Example Embodiments

In general, this document uses the following terminology. A customer edge (CE) includes a network device, such as a router, which is physically or logically positioned at the edge of a customer network. The CE may attach the customer network to a virtual private network (VPN) provider. A provider edge (PE) includes a network device, such as a router, which is physically or logically positioned at the edge of a provider's network. In some example configurations, one or more CE devices may be attached with a PE. A VPN label includes a multiprotocol label switching (MPLS) label associated with a route to a customer prefix in a VPN. The VPN label may also be referred to as a VPN route label. A VPN Routing and Forwarding (VRF) table is a lookup table managed by a PE enabling the PE to correctly manage traffic between CEs in a VPN.

FIG. 1 is a diagram of a networked system 100, in accordance with an example embodiment. The networked system 100 may include network devices, which may include a device at the edge of a particular network (e.g., a network edge). In the example illustrated, two customer edges (CE) 102A, 102B are connected to two provider edges (PE) 104A, 104B, respectively. The customer edges 102A, 102B and provider edges 104A, 104B may include devices such as routers or other network devices that analyze or direct network traffic. The provider edges 104A, 104B are connected via a backbone or core network 106 that includes one or more provider core (P) devices 108. The provider core devices 108 may include routers or other network traffic-handling devices. In addition, one or more hosts 110A, 110B may be connected to the customer edges 102A, 102B, respectively. Other network configurations may be used without departing from the inventive subject matter described herein.

Examples of computer networks, such those illustrated in FIG. 1, include local area networks and wide area networks. A local area network connects the nodes over dedicated private communications links located in the same general physical location, such as a building or campus. A wide area network, on the other hand, connects geographically dispersed nodes over long-distance communications links, such as common carrier telephone lines, optical light paths, synchronous optical networks (SONET), or synchronous digital hierarchy (SDH) links. The Internet is an example of a wide area network that connects disparate networks throughout the world, providing global communication between nodes on various networks. The nodes communicate over computer network 100 by exchanging discrete frames or packets of data according to predefined protocols, such as Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, interior gateway protocol (IGP), and other protocols.

In the network configuration illustrated in FIG. 1, the provider edges 104A, 104B are configured to provide a virtual private network (VPN) using multiprotocol label switching (MPLS). During operation, HOST2 110B may join a multicast group by using Internet Group Membership Protocol (IGMP). After HOST2 110B joins an appropriate group, the content broadcaster, HOST1 110A, may send one or more session initiation messages and the receiver, HOST2 110B, may communicate one or more connection admission control (CAC) request messages. Similarly, HOST2 110B and HOST1 110A may participate in a unicast connection using unicast routing services, as an example.

In an example embodiment, the hosts (e.g., HOST1 110A and HOST2 110B) use the Resource ReSerVation Protocol (RSVP). RSVP may be used to perform admission control as part of an integrated services (int-serv) architecture. As provided by RSVP, reservation initiation messages include an RSVP Path message and the CAC request messages include an RSVP reservation (Resv) message. After the sender receives an RSVP Resv message, the sender begins sending data in accordance with the resource reservations requested by the RSVP Resv message.

As used herein, it should be noted that the terms "RSVP Path message" and "Path message" may be used interchangeably and refer to a Path message as constructed using the RSVP protocol. Also, other RSVP messages may be referred to by their name, such as, for example, referring to an "RSVP Resv message" as simply a "Resv message."

In another example embodiment, the hosts (e.g., HOST1 110A and HOST2 110B) use the NSIS protocol. Similar to RSVP, NSIS may be used to perform admission control over the HOST1-HOST2 link. Next Steps in Signaling (NSIS) provides a framework that concentrates on a two-layer signaling paradigm. The intention is to re-use, where appropriate, the protocol mechanisms of RSVP, while at the same time simplifying these mechanisms and implementing a more general signaling model. NSIS decomposes the overall signaling protocol suite into a generic (lower) layer and a separate upper layer that corresponds with each signaling application. In an example, for on-path QoS signaling, the lower layer is General Internet Signaling Transport (GIST) and the upper layer is NSIS Signaling Layer Protocol (NSLP) for Quality-of-Service Signaling. The upper layer of NSLP includes two messages: an NSIS QUERY message and an NSIS RESERVE message.

In an embodiment, an NSIS QUERY message may be used in an analogous manner to the RSVP Path message to transmit network environmental information associated with a QoS (Quality of Service) resource reservation, such as an MPLS VPN label. The MPLS VPN label may be used by an egress PE to identify a relevant local VRF for NSIS QUERY processing. In such an embodiment, an NSIS RESERVE message may then be used in an analogous manner to the RSVP Resv message, to echo back network environmental information that allows an ingress PE to identify a corresponding relevant local VRF.

Figure 2:
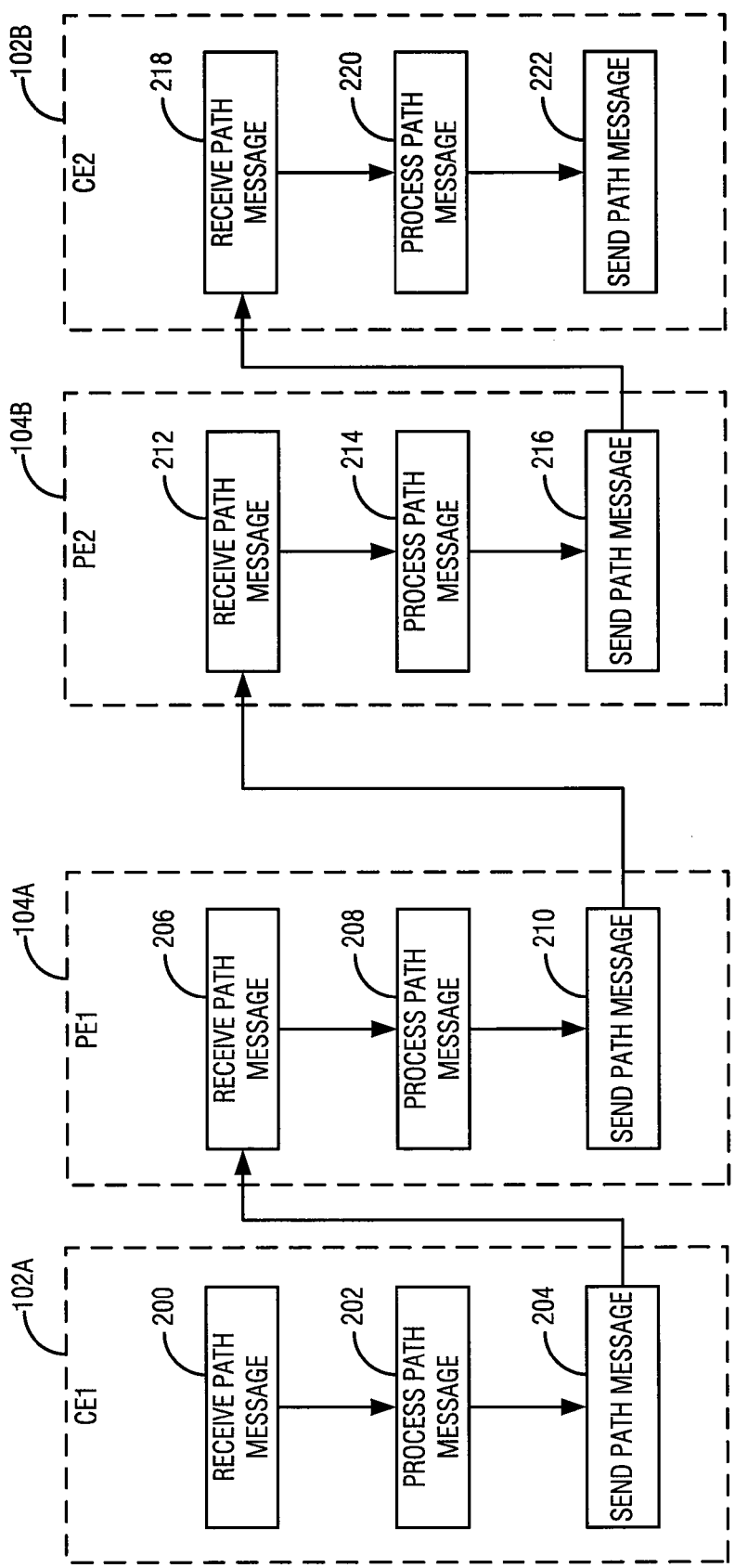
FIG. 2 is a block diagram, in accordance with an example embodiment, illustrating control and data flow between two hosts on a network.

FIG. 2 is a block diagram, in accordance with an example embodiment, illustrating control and data flow between two hosts on a network using RSVP. As shown in FIG. 2, the system includes a first customer edge (CE1) 102A, a first provider edge (PE1) 104A, a second provider edge (PE2) 104B, and a second customer edge (CE2) 102B. The control and data flow illustrated is to establish a unidirectional reservation for a point-to-point flow. At 200, CE1 102A receives an RSVP Path message. The Path message may have originated from a host (e.g., HOST1 110A) that CE1 102A is servicing and is addressed to a receiver (e.g., HOST2 110B). CE1 102A processes the Path message (block 202) using RSVP procedures and forwards the Path message toward the receiver (block 204) along the link CE1-PE1. PE1 104A receives the Path message (block 206), processes the Path message (block 208), and forwards the Path message toward a receiver across the provider core network to PE2 104B (block 210). In an example embodiment, PE1 104A addresses the Path message directly to PE2 104B, instead of to a final destination address (e.g., a host connected to CE2 102B). In an example embodiment, PE1 104A recognizes an RSVP Path message using the IP Router Alert option. PE2 104B in turn receives the Path message (block 212), processes the Path message (block 214), and forwards the Path message toward the receiver (block 216) along the link PE2-CE2. Then, CE2 102B receives the Path message (block 218), processes the Path message using RSVP procedures (block 220), and forwards the Path message to the receiver (block 222).

Figure 3:
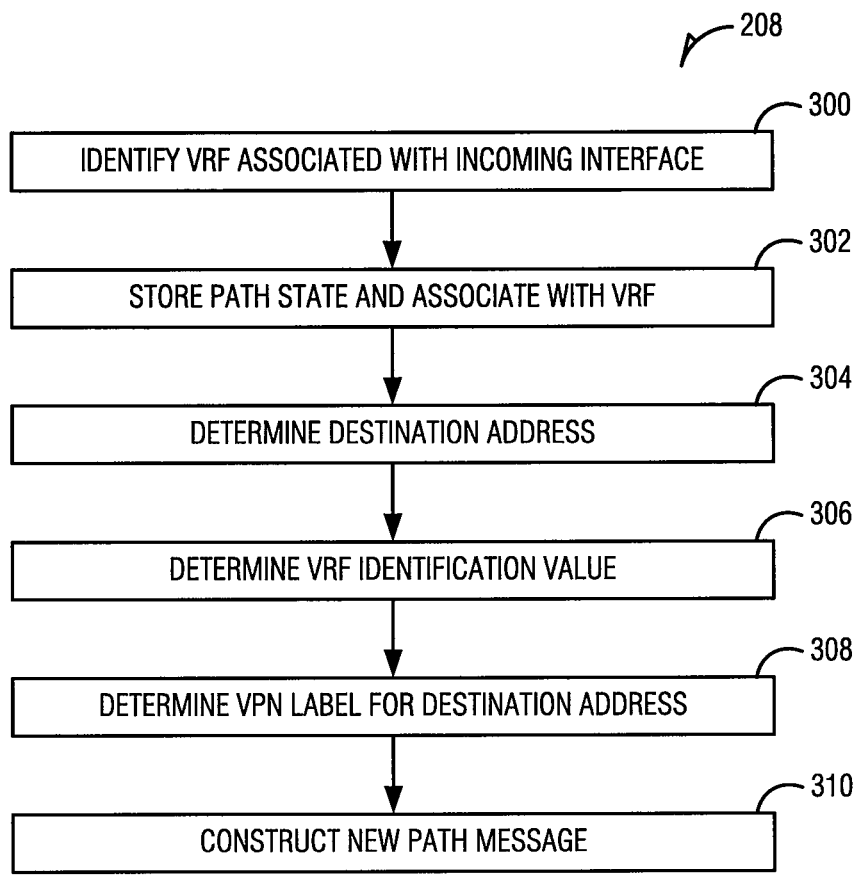
FIG. 3 is a flow diagram, in accordance with an example embodiment, illustrating a method of processing a Path message at an ingress provider edge (PE)

FIG. 3 is a flow diagram, in accordance with an example embodiment, illustrating a method 208 of processing a Path message at an ingress PE. In general, when a Path message arrives at the ingress PE (e.g., PE1 104A) the PE establishes a suitable path state and forward the Path message to the egress PE (e.g., PE2 104B).

At 300, when the ingress PE (e.g., PE1 104A) receives a Path message from CE1 that is addressed to the receiver (e.g., HOST2 110B), the VRF that is associated with the incoming interface is identified, just as for other data path operations.

At 302, the path state for the session is stored, and is associated with that VRF, so that potentially overlapping addresses among different VPNs do not appear to belong to the same session. According to RSVP operations, the path state includes at least the unicast IP address of the previous hop node, which may be used to route responsive RSVP messages hop-by-hop along the reverse path.

At 304, the destination address of the receiver is looked up in the appropriate VRF, and the Border Gateway Protocol (BGP) Next-Hop for that destination is identified. The BGP Next-Hop is the address of the egress PE (PE2 104B).

At 306, a VRF_ID object is constructed and is used to carry a locally significant VRF identification value. In order to ensure that any responsive messages that will be sent to the ingress PE by the egress PE can be associated with the correct VPN context, the Path message may contain an identification value that can be echoed back inside responsive messages and thereby used to identify the corresponding VRF. Locally significant is meant to indicate that the VRF identification value is meaningful to the PE that created the object. As such, the identification value may be generated using a localized algorithm, such as a random number generator or an indexing algorithm, to maintain unique values at the PE. Other types of identification may be used, such as a globally-significant value, in example embodiments. In some embodiments, the VRF_ID object is not used, instead using other information to identify the VRF associated with the QoS resource reservation request.

At 308, the VPN label for the destination address of the receiver is obtained and placed in a new RSVP object, VPN_LABEL. The VPN_LABEL object is discussed in further detail below (see FIG. 4). The VPN label for the destination may be obtained from a lookup table or similar structure.

At 310, a new (outgoing) Path message is constructed with a destination address equal to the address of the egress PE identified above. This outgoing Path message contains all the objects from the original Path message, plus the VRF_ID object and the VPN_LABEL object. It should be noted that the SESSION object contains the ultimate (e.g., customer) destination address of the flow, while the IP header for the message contains the address of the egress PE. By addressing the egress PE directly, the Router Alert IP option need not be relied on for interception of the Path message by the egress PE. This is useful in the context of MPLS-VPNs as usually an RSVP message would be MPLS encapsulated and thus the Router Alert option is not visible to the egress PE.

Figure 4:
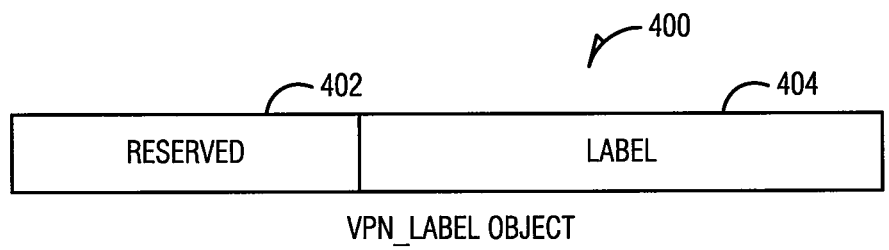
FIG. 4 is a diagram of a VPN_LABEL data object, in accordance with an example embodiment.

FIG. 4 is a diagram of a VPN_LABEL data object 400, in accordance with an example embodiment. The VPN_LABEL object includes a reserved portion 402 and a label portion 404. In an example embodiment, the reserved portion 402 includes 12 bits and the label portion 404 includes 20 bits. In an example embodiment, the reserved portion 402 is set to zero on transmission and ignored on receipt. The VPN_LABEL object has an RSVP C-Type and a class identifier. In an example embodiment, the RSVP C-Type is defined to be 1. In an example embodiment, the VPN_LABEL object appears in all RSVP messages that contain a SESSION object and is sent from an ingress PE to an egress PE. In an example embodiment, the class number is assigned from the range 0x11bbbbbb so that messages containing the VPN_LABEL object will be ignored and forwarded by routers that do not understand this class number.

Figure 5:
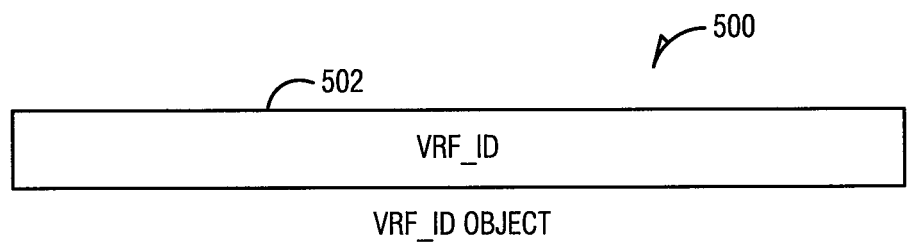
FIG. 5 is a diagram of a VRF_ID data object, in accordance with an example embodiment.

FIG. 5 is a diagram of a VRF_ID data object 500, in accordance with an example embodiment. The VRF_ID object includes an identifier portion 502. In an example embodiment, the identifier portion 502 has a size of 32 bits. The VRF_ID object includes an identifier that is a locally significant opaque value. The VRF_ID object has an RSVP C-Type and a class identifier. In an example embodiment, the RSVP C-Type is defined to be 1. In an example embodiment, the class number is assigned from the range 0x11bbbbbb so that messages containing the VRF_ID object will be ignored and forwarded by routers that do not understand this class number.

Figure 6:
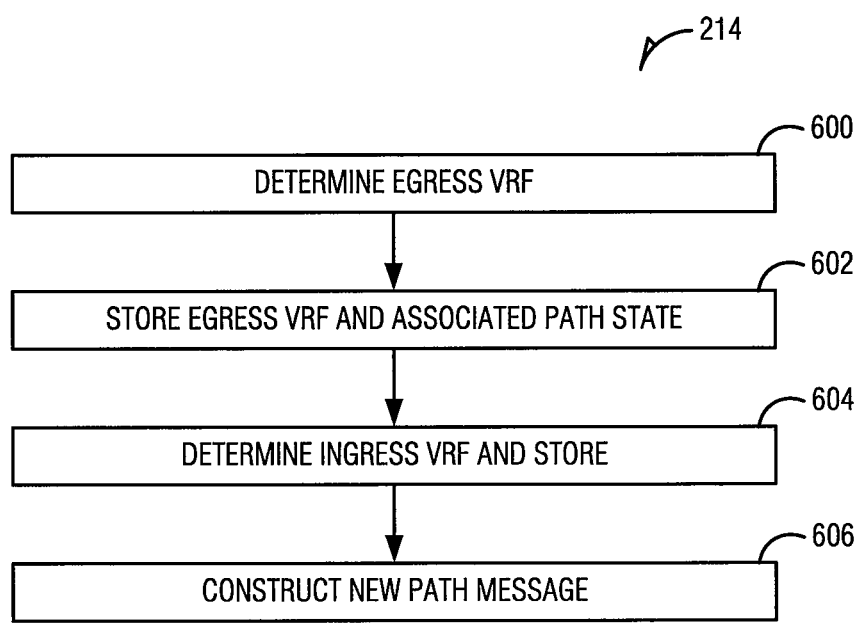
FIG. 6 is a flow diagram, in accordance with an example embodiment, illustrating a method of processing a Path message at an egress PE.

FIG. 6 is a flow diagram, in accordance with an example embodiment, illustrating a method 214 of processing a Path message at an egress PE. In general, the egress PE is configured to (1) determine the egress VRF for the specified flow in order to forward the Path message toward the correct CE, and ultimately to the final destination of the message and (2) store appropriate information to be able to construct one or more reply messages to the ingress PE.

At 600, the egress PE VRF is determined. In an example embodiment, the MPLS label contained in the VPN_LABEL object and the destination IP address contained in the SESSION object are extracted and used to determine the forwarding path information for MPLS-encapsulated packets. The forwarding path information may include the outgoing interface information, including the egress VRF, that would have been used had a packet with that MPLS label and IP address been received. At 602, the egress VRF is stored with the path state to facilitate the processing of reply messages for this session. At 604, the VRF_ID object is accessed and the ingress PE's VRF identifier is stored. At 606, a new Path message is constructed. The new Path message is addressed to the receiver's customer edge (e.g., CE2 102B) using the destination IP address obtained from the SESSION object. Other portions of the Path message, such as the RSVP_HOP object, may be configured as per RSVP processing.

Figure 7:
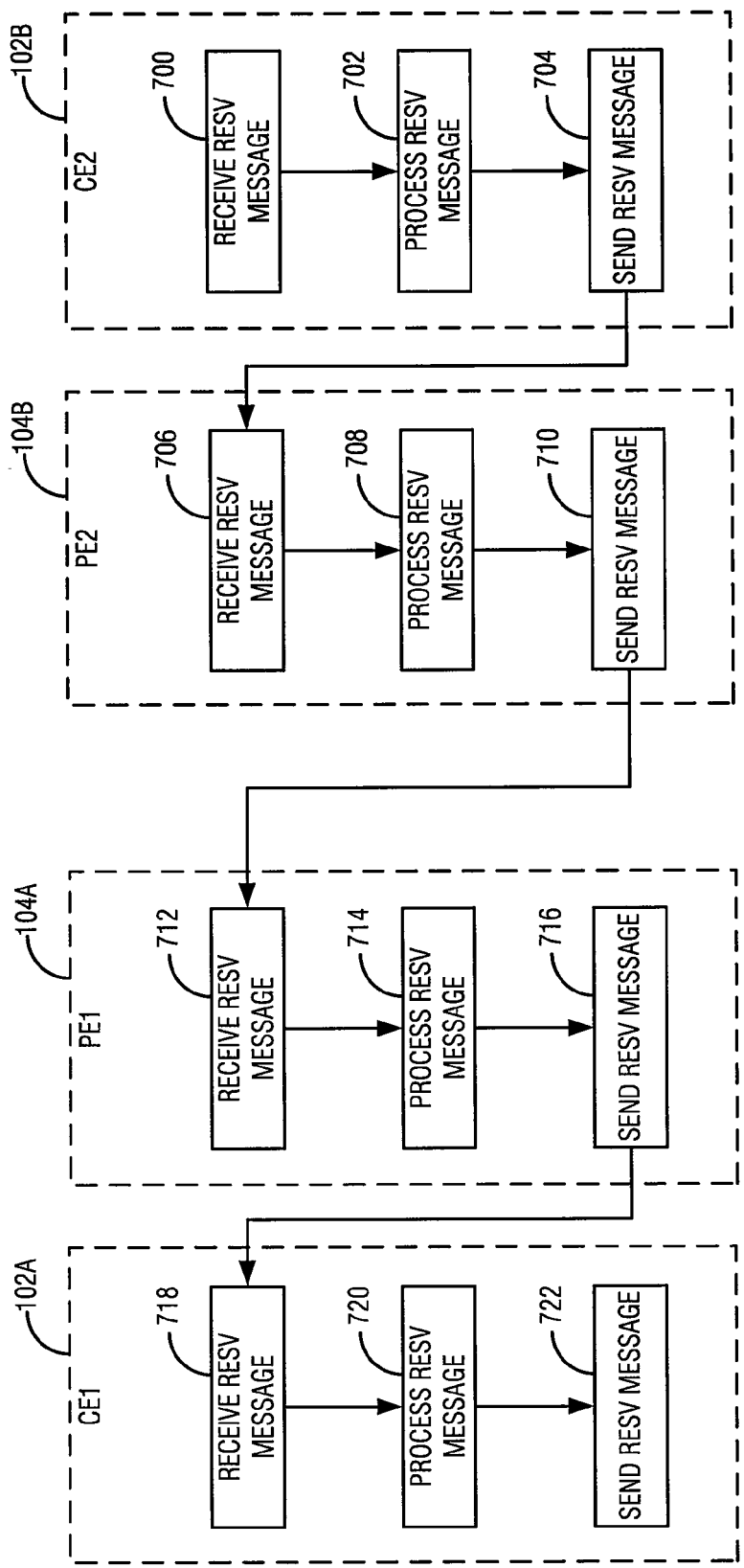
FIG. 7 is a block diagram, in accordance with an example embodiment, illustrating control and data flow between two hosts on a network.

FIG. 7 is a block diagram, in accordance with an example embodiment, illustrating control and data flow between two hosts on a network. The control and data flow illustrated in FIG. 7 illustrate signaling in the reverse direction as that illustrated in FIG. 2. An RSVP responsive message is communicated back through the network in response to a corresponding Path message. Although the example embodiment illustrated in FIG. 7 describes an RSVP reservation (Resv) message, it will be appreciated that other RSVP signaling messages may be communicated using similar processes.

At 700, CE2 102B receives an RSVP Resv message. The Resv message may have originated from a host (e.g., HOST2 110B) that CE2 102B is servicing and is addressed to a receiving device (e.g., CE2 102B). RSVP Resv messages travel hop by hop, so they are addressed to the RSVP Previous Hop. CE2 102B processes the Resv message (block 702) using RSVP procedures and forwards the Resv message upstream toward the sender (block 704) along the link CE2-PE2. PE2 104B receives the Resv message (block 706), processes the Resv message (block 708), and forwards the Resv message again upstream toward the sender across the provider core network to the RSVP Previous Hop, PE 104A (block 710). PE1 104A in turn receives the Resv message (block 712), processes the Resv message (block 714), and forwards the Resv message toward the RSVP Previous Hop (block 716) along the link PE1-CE1. Then, CE1 102A receives the Resv message (block 718), processes the Resv message using RSVP procedures (block 720), and forwards the Resv message to the RSVP Previous Hop (e.g., sender) (block 722).

Figure 8:
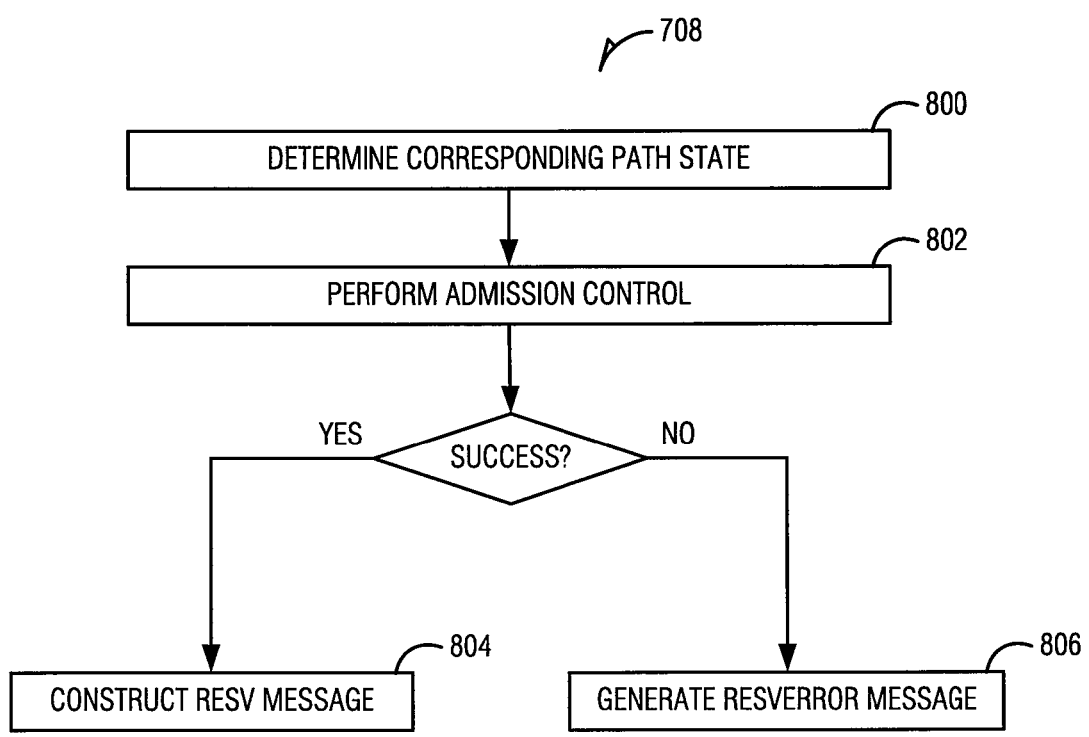
FIG. 8 is a flow diagram, in accordance with an example embodiment, illustrating a method of processing an RSVP reservation (Resv) message at an egress PE.

FIG. 8 is a flow diagram, in accordance with an example embodiment, illustrating a method 708 of processing a Resv message at an egress PE. In general, when a Resv message arrives at the egress PE (e.g., PE2 104B) the PE establishes a suitable Resv message and forwards the Resv message to the ingress PE (e.g., PE1 104A).

When a host at the customer site (e.g., HOST2 110B) originates a Resv message for the session, RSVP procedures apply until the Resv, making its way back towards the sender host (e.g., HOST1 110A), arrives at the "egress" PE (it is "egress" with respect to the direction of data flow). At 800, the corresponding path state is determined. In an example embodiment, on arriving at PE2 104B, the SESSION and FILTER objects in the Resv, and the VRF in which the Resv was received, are used to find the matching path state stored previously. At 802, admission control is performed on the CE2-PE2 link. At 804, if admission control is successful, a Resv message is constructed. The Resv message is addressed to the ingress PE (e.g., PE1 104A) and includes the VRF_ID object that was obtained from the Path message as described above. The Resv message is addressed to the ingress PE and sent. At 806, if admission control is not successful, a ResvError message is sent towards the receiver using RSVP processing.

Figure 9:
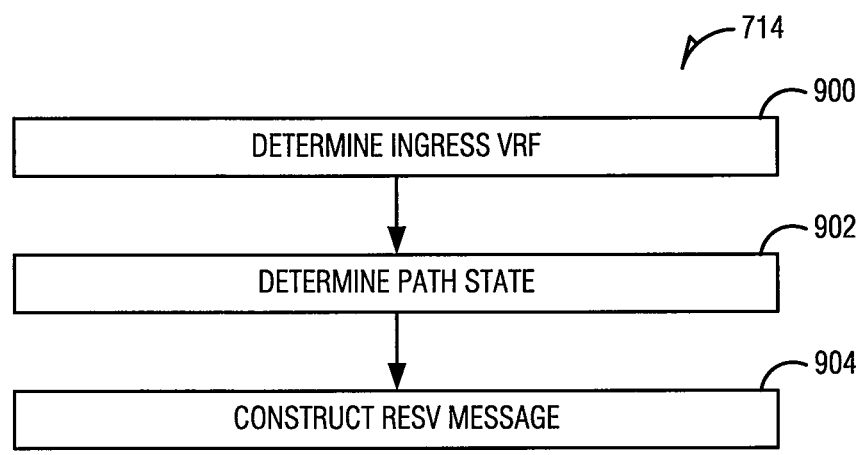
FIG. 9 is a flow diagram, in accordance with an example embodiment, illustrating a method of processing a Resv message at an ingress PE.

FIG. 9 is a flow diagram, in accordance with an example embodiment, illustrating a method 714 of processing a Resv message at an ingress PE. At 900, the ingress PE (e.g., PE1 104A) extracts the VRF_ID object and uses the VRF_ID object to determine which VRF the session is associated with. At 902, a corresponding path state is determined. At 904, a Resv message is constructed. In an example embodiment, the ingress PE does not perform admission control over the provider's backbone for this reservation.

Other types of RSVP messages are processed in a similar manner as that described above. For example, processing of RSVP messages PathError, PathTear, ResvTear, ResvErr, and ResvConfirm may include the ingress PE's VRF identification, the VPN label, and be directly addressed to the appropriate PE, removing the need for the Router Alert IP option.

In an example embodiment, admission control over the provider's backbone may be implemented in conjunction with other aspects described herein. For example, in an example embodiment, aggregate reservations may be used to achieve a form of admission control across provider routers. In another embodiment, an MPLS traffic engineering (TE) tunnel from an ingress PE to an egress PE may be constructed and used as a means to perform aggregate admission control in the backbone.

Figure 10:
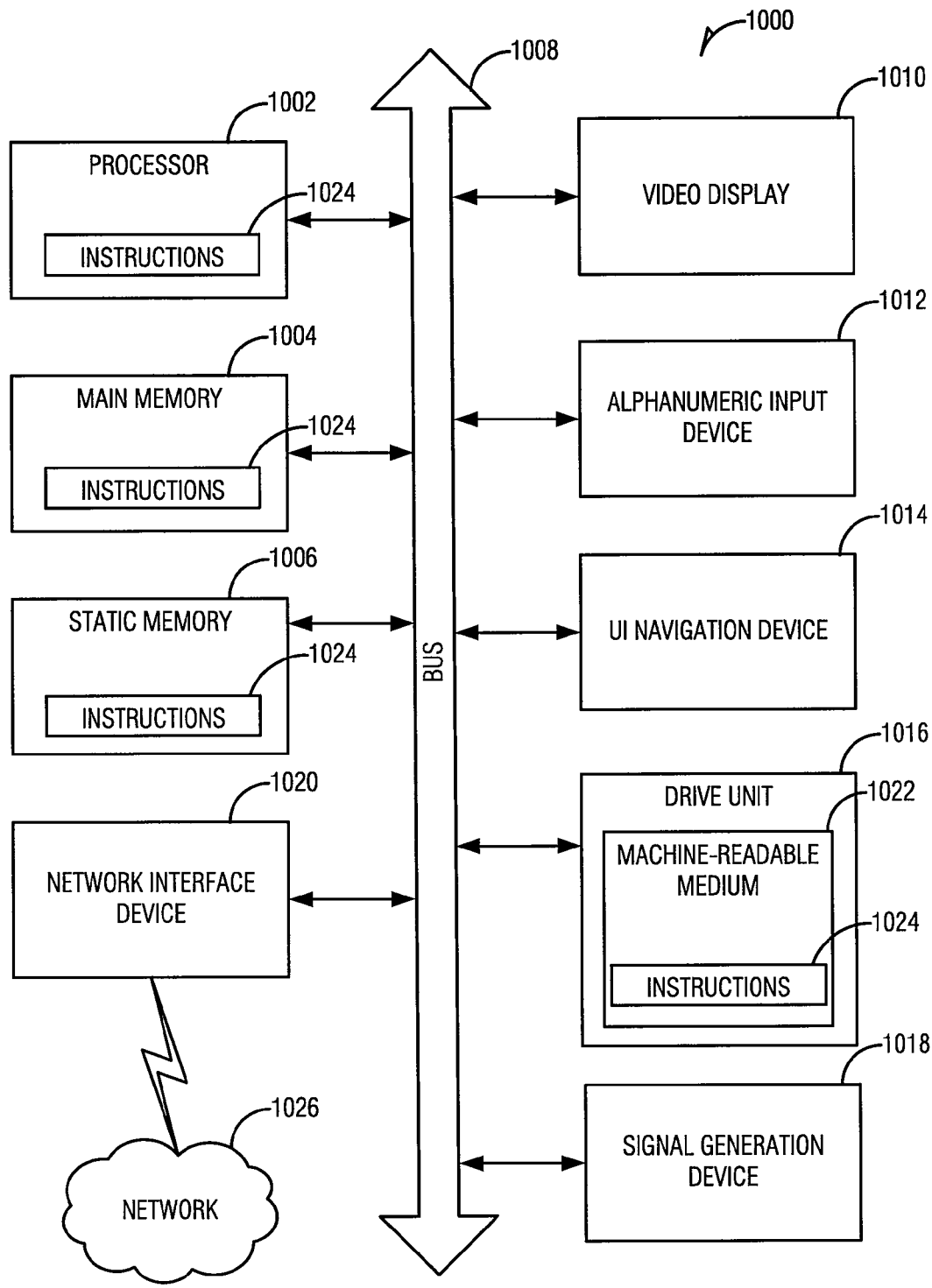
FIG. 10 is a block diagram of a machine, in accordance with an example embodiment, in the example form of computer system within which a set of instructions, for causing the machine to perform any one or more of the methodologies discussed herein, may be executed.

FIG. 10 is a simplified block diagram of a machine, in accordance with an example embodiment, in the example form of computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a plasma display, a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

The disk drive unit 1016 may include machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, where the main memory 1004 and the processor 1002 also constitute machine-readable, tangible media.

Software 1024 may further be transmitted or received over network 1026 via network interface device 1020 utilizing any one of a number of well-known transfer protocols (e.g., HTTP).

While machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. This disclosure is intended to cover any and all adaptations or variations of various embodiments. Combinations of the above embodiments, and other embodiments not specifically described herein, will be apparent to those of skill in the art upon reviewing the above description. For example, one functional, computational, or hardware module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art.

In the appended claims, the terms "including" and "in which" are used as the plain-English equivalents of the respective terms "comprising" and "wherein," respectively. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements or a particular ordering on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
  receiving a quality of service (QoS) resource reservation request at an ingress provider edge (PE) device from a customer edge (CE) device;
  determining a path state associated with the QoS resource reservation request, the path state including a previous hop address;
  storing the path state and storing an association between the path state and a virtual private network routing and forwarding table (VRF) associated with the QoS resource reservation request;
  constructing an outgoing message that includes information allowing an egress PE device to identify the virtual private network routing and forwarding table (VRF) associated with a resource reservation resulting from the QoS resource reservation request, wherein the outgoing message is addressed to the egress PE device, and wherein the ingress PE device and the egress PE device are connected by a virtual private network (VPN), thereby creating a direct signaling channel across the VPN between the ingress PE device and the egress PE device; and
  transmitting the outgoing message to the egress PE device.

2. The method of claim 1, wherein the information allowing VRF identification is echoed back by the egress PE device and used by the ingress PE device to identify the VRF associated with the resource reservation resulting from the QoS resource reservation request.

3. The method of claim 1, wherein the information allowing VRF identification includes a VRF identification value.

4. The method of claim 1, wherein the QoS reservation request includes a Next Steps in Signaling (NSIS) QUERY message.

5. The method of claim 1, wherein the QoS reservation request includes an incoming ReSerVation Protocol (RSVP) Path message, and wherein the constructing the outgoing message includes constructing an outgoing RSVP Path message, the outgoing RSVP Path message including a virtual private network (VPN) label.

6. The method of claim 5, wherein the constructing the outgoing RSVP Path message comprises:
  determining an ingress PE VRF associated with the incoming RSVP Path message;
  identifying a destination address associated with the incoming RSVP Path message;
  addressing the outgoing Path message to the egress PE device using the destination address;
  obtaining a VRF identification value associated with the ingress PE VRF; and
  determining a virtual private network (VPN) label associated with the egress PE device.

7. The method of claim 6, wherein the destination address comprises a next-hop address.

8. The method of claim 5, further comprising:
  determining a path state associated with the incoming RSVP Path message;
  storing the path state; and
  storing an association between the path state and the ingress PE VRF.

9. The method of 1, further comprising:
  receiving a response message from the egress PE device, the response message corresponding with the QoS reservation request and including the information allowing VRF identification; and
  using the information allowing VRF identification to transmit an outgoing response message to the CE device, the outgoing response corresponding with the response message.

10. The method of claim 9, wherein the response message includes an incoming RSVP message and wherein the outgoing response includes an outgoing RSVP message.

11. The method of claim 10, wherein the using of the information allowing VRF identification comprises:
  determining the path state associated with the ingress PE VRF based on the stored association between the path state and the ingress PE VRF; and
  using the path state to transmit the outgoing response to the CE device.

12. The method of claim 10, wherein the incoming RSVP message comprises an RSVP reservation (Resv) message.

13. The method of claim 12, further comprising performing admission control on resources available in the network between the ingress PE device and the egress PE device.

14. The method of claim 13, wherein the performing of the admission control comprises using an aggregate reservation over a Multiprotocol Label Switching Traffic Engineering (MPLS-TE) tunnel.

15. A method comprising:
receiving a quality of service (QoS) resource reservation request at an egress provider edge (PE) device from an ingress PE device, wherein the ingress PE device and the egress PE device are connected by a virtual private network (VPN), and wherein the QoS resource reservation request is addressed to the egress PE device from the ingress PE device, thereby using a direct signaling channel across the VPN between the ingress PE device and the egress PE device;
extracting information identifying the virtual private network routing and forwarding table (VRF) associated with a resource reservation resulting from the QoS resource reservation request;
determining a path state corresponding to the QoS resource reservation request;
storing the information identifying the VRF, and storing an association between the information identifying the VRF and the path state;
constructing a message to a customer edge (CE) device based on the VRF identifying information; and
transmitting the message to the CE device.

16. The method of 15, further comprising:
receiving a response message corresponding with the QoS resource reservation request;
constructing a message to an ingress provider edge (PE) device, the message including a virtual private network routing and forwarding table (VRF) identifying information, the VRF identifying information obtained from the QoS resource reservation request; and
transmitting the message to the ingress PE device.

17. The method of 16, wherein the response message that corresponds with the QoS resource reservation request includes a Next Steps in Signaling (NSIS) RESERVE message.

18. The method of 16, wherein the response message that corresponds with the QoS resource reservation request includes a ReSerVation Protocol (RSVP) Resv message.

19. The method of 15, wherein the QoS resource reservation request includes an NSIS QUERY message.

20. The method of 15, wherein the QoS resource reservation request includes a ReSerVation Protocol (RSVP) Path message.

21. The method of claim 20, further comprising:
extracting information allowing VRF identification from the incoming RSVP Path message;
determining an egress provider edge (PE) virtual VRF based on the VPN label;
determining a path state corresponding to the incoming RSVP Path message;
storing the path state and an association between the path state and the egress PE VRF; and
storing the information allowing VRF identification and an association between the information allowing VRF identification and path state.

22. The method of claim 21, further comprising:
receiving an incoming RSVP message from the CE device, the incoming RSVP message corresponding with the outgoing Path message;
determining the path state using the association between the path state and the egress PE VRF;
determining the information allowing VRF identification using the association between the VRF identifying information and the path state;
constructing an outgoing RSVP message addressed to an ingress PE device, the outgoing RSVP message including the path state and the information allowing VRF identification; and
transmitting the outgoing RSVP message to the ingress PE device.

23. The method of claim 21, wherein the incoming RSVP message comprises an incoming RSVP reservation (Resv) message.

24. The method of claim 23, further comprising:
performing admission control on the link between an egress PE device and the CE device using the incoming RSVP Resv message; and
transmitting an outgoing RSVP Resv message when admission control is successful.

25. The method of claim 24, further comprising transmitting an outgoing RSVP reservation error (ResvError) message when admission control is unsuccessful.

26. An apparatus comprising:
a processor; and
a memory in communication with the processor, the memory having instructions stored thereon executable by the processor, which when executed, the processor operable to:
receive a quality of service (QoS) resource reservation request at an ingress provider edge (PE) device from a customer edge (CE) device;
determine a path state associated with the QoS resource reservation request, the path state including a previous hop address;
store the path state and an association between the path state and a virtual private network routing and forwarding table (VRF) associated with the QoS resource reservation request;
construct an outgoing message that includes information allowing an egress PE device to identify the virtual private network routing and forwarding table (VRF) associated with a resource reservation resulting from the QoS resource reservation request, wherein the outgoing message is addressed to the egress PE device, and wherein the ingress PE device and the egress PE device are connected by a virtual private network (VPN), thereby creating a direct signaling channel across the VPN between the ingress PE device and the egress PE device; and
transmit the outgoing message to the egress PE device.

27. The apparatus of claim 26, wherein the QoS reservation request includes an incoming ReSerVation Protocol (RSVP) Path message, and wherein the constructing the outgoing message includes constructing an outgoing RSVP Path message, the outgoing RSVP Path message including a virtual private network (VPN) label.

28. The apparatus of claim 27, wherein the constructing of the outgoing RSVP Path message comprises instructions executable by the processor, which when executed, the processor being operable to:
determine an ingress PE VRF associated with the incoming RSVP Path message;
identify a destination address associated with the incoming RSVP Path message;
address the outgoing Path message to the egress PE device using the destination address;
obtain a VRF identification value associated with the ingress PE VRF; and determine a virtual private network (VPN) label associated with the egress PE device.

29. The apparatus of claim 27, further comprising instructions executable by the processor, which when executed, the processor being operable to:
   determine a path state associated with the incoming RSVP Path message;
   store the path state; and
   store an association between the path state and the ingress PE VRF.

30. The apparatus of claim 26, further comprising instructions executable by the processor, which when executed, the processor being operable to:
   receive a response message from the egress PE device, the response message corresponding with the QoS reservation request and including the information allowing VRF identification; and
   use the information allowing VRF identification to transmit an outgoing response message to the CE device, the outgoing response corresponding with the response message.

31. The apparatus of claim 30, wherein the use of the information allowing VRF identification comprises instructions executable by the processor, which when executed, the processor being operable to:
   determining the path state associated with the ingress PE VRF based on the stored association between the path state and the ingress PE VRF; and
   using the path state to transmit the outgoing response to the CE device.

32. The apparatus of claim 31, further comprising instructions executable by the processor, which when executed, the processor being operable to perform admission control on resources available in the network between the ingress PE device and the egress PE device.

33. The apparatus of claim 32, wherein the performing of the admission control comprises instructions executable by the processor, which when executed, the processor being operable to use an aggregate reservation over a Multiprotocol Label Switching Traffic Engineering (MPLS-TE) tunnel.

34. An apparatus comprising:
   means for receiving a quality of service (QoS) resource reservation request at an ingress provider edge (PE) device from a customer edge (CE) device;
   means for determining a path state associated with the QoS resource reservation request, the path state including a previous hop address;
   means for storing the path state and an association between the path state and a virtual private network routing and forwarding table (VRF) associated with the QoS resource reservation request;
   means for constructing an outgoing message that includes information allowing an egress PE device to identify the virtual private network routing and forwarding table (VRF) associated with a resource reservation resulting from the QoS resource reservation request, wherein the outgoing message is addressed to the egress PE device, and wherein the ingress PE device and the egress PE device are connected by a virtual private network (VPN), thereby creating a direct signaling channel across the VPN between the ingress PE device and the egress PE device; and
   means for transmitting the outgoing message to the egress PE device.

35. An apparatus comprising:
   a processor; and
   a memory in communication with the processor, the memory having instructions stored thereon executable by the processor, which when executed, the processor being operable to:
      receive a quality of service (QoS) resource reservation request at an egress provider edge (PE) device from an ingress PE device, wherein the QoS resource reservation request is addressed to the egress PE device from the ingress PE device, and wherein the ingress PE device and the egress PE device are connected by a virtual private network (VPN), thereby using a direct signaling channel across the VPN between the ingress PE device and the egress PE device;
      extract information identifying the virtual private network routing and forwarding table (VRF) associated with a resource reservation resulting from the QoS resource reservation request;
      determine a path state corresponding to the QoS resource reservation request;
      store the information identifying the VRF, and an association between the information identifying the VRF and the path state;
      construct a message to a customer edge (CE) device based on the VRF identifying information and
      transmit the message to the CE device.

36. The apparatus of claim 35, further comprising instructions executable by the processor, which when executed, the processor being operable to:
   receive a response message corresponding with the QoS resource reservation request; and
   construct a message to an ingress provider edge (PE) device, the message including a virtual private network routing and forwarding table (VRF) identifying information, the VRF identifying information obtained from the QoS resource reservation request.

37. The apparatus of claim 35, wherein the QoS resource reservation request includes a ReSerVation Protocol (RSVP) Path message.

38. The apparatus of claim 37, further comprising instructions executable by the processor, which when executed, the processor being operable to:
   extract a virtual private network routing and forwarding table (VRF) identification value from the incoming RSVP Path message;
   determine an egress provider edge (PE) virtual VRF based on the VPN label;
   determine a path state corresponding to the incoming RSVP Path message;
   store the path state and an association between the path state and the egress PE VRF; and
   store the VRF identification value and an association between the VRF identification value and the egress PE VRF.

39. The apparatus of claim 38, further comprising instructions executable by the processor, which when executed, the processor being operable to:
   receive an incoming RSVP message from the CE device, the incoming RSVP message corresponding with the outgoing Path message;
   determine the path state using the association between the path state and the egress PE VRF;
   determine the VRF identification value using the association between the VRF identification value and the path state;
   construct an outgoing RSVP message addressed to an ingress PE device, the outgoing RSVP message including the path state and the VRF identification value; and
   transmit the outgoing RSVP message to the ingress PE device.

* * * * *

UNITED STATES PATENT AND TRADEMARK OFFICE
CERTIFICATE OF CORRECTION

| | | |
|---|---|---|
| PATENT NO. | : 8,565,248 B2 | Page 1 of 1 |
| APPLICATION NO. | : 12/147265 | |
| DATED | : October 22, 2013 | |
| INVENTOR(S) | : Le Faucheur et al. | |

It is certified that error appears in the above-identified patent and that said Letters Patent is hereby corrected as shown below:

In the Claims

In column 14, line 20, in Claim 35, after "information", insert --;--, therefor

Signed and Sealed this
Sixteenth Day of September, 2014

Michelle K. Lee
*Deputy Director of the United States Patent and Trademark Office*